United States Patent [19]
Miyakoshi et al.

[11] Patent Number: 5,675,199
[45] Date of Patent: Oct. 7, 1997

[54] BEARING DEVICE WITH A PRIMARY AND SECONDARY MAGNETIC FLUID SEALING MECHANISM

[75] Inventors: Toshihiko Miyakoshi; Arihiro Yonezawa; Tamotsu Nose, all of Shimosuwa-machi, Japan

[73] Assignee: Sankyo Seiki Mfg. Co., Ltd., Nagano, Japan

[21] Appl. No.: 442,321

[22] Filed: May 16, 1995

[30] Foreign Application Priority Data

| May 17, 1994 | [JP] | Japan | 6-126984 |
| Jun. 21, 1994 | [JP] | Japan | 6-162671 |
| Aug. 31, 1994 | [JP] | Japan | 6-230796 |

[51] Int. Cl.[6] .................. H02K 5/16; H02K 7/08
[52] U.S. Cl. .................................. 310/90; 277/135
[58] Field of Search ............ 310/90, 90.5; 123/90.37; 277/80, 135

[56] References Cited

U.S. PATENT DOCUMENTS

| 3,620,584 | 11/1971 | Rosenweig | 277/80 |
| 3,859,402 | 1/1975 | Bintliff et al. | 264/49 |
| 4,357,021 | 11/1982 | Raj et al. | 277/1 |
| 4,527,802 | 7/1985 | Wilcock et al. | 277/1 |
| 4,565,379 | 1/1986 | Ballhaus | 277/25 |
| 4,630,943 | 12/1986 | Stahl et al. | 384/133 |
| 4,694,213 | 9/1987 | Gowda et al. | 310/90 |
| 4,890,850 | 1/1990 | Raj et al. | 277/80 |
| 4,973,064 | 11/1990 | Hosoya | 277/80 |
| 5,152,539 | 10/1992 | Takii et al. | 277/80 |
| 5,267,737 | 12/1993 | Cossette et al. | 277/80 |
| 5,323,076 | 6/1994 | Hajec | 310/90 |

Primary Examiner—Thomas M. Dougherty
Assistant Examiner—Jonathan Link
Attorney, Agent, or Firm—McAulay Fisher Nissen Goldberg & Kiel, LLP

[57] ABSTRACT

A bearing device with a primary and secondary magnetic fluid seal for use in a motor. A shaft and a frame in the motor are interconnected by a bearing. A magnetic fluid is placed in a region between the shaft and frame. The primary magnetic fluid seal is positioned above the bearing and the secondary magnetic fluid seal is positioned above the primary magnetic fluid seal to form a two-layered seal.

15 Claims, 12 Drawing Sheets

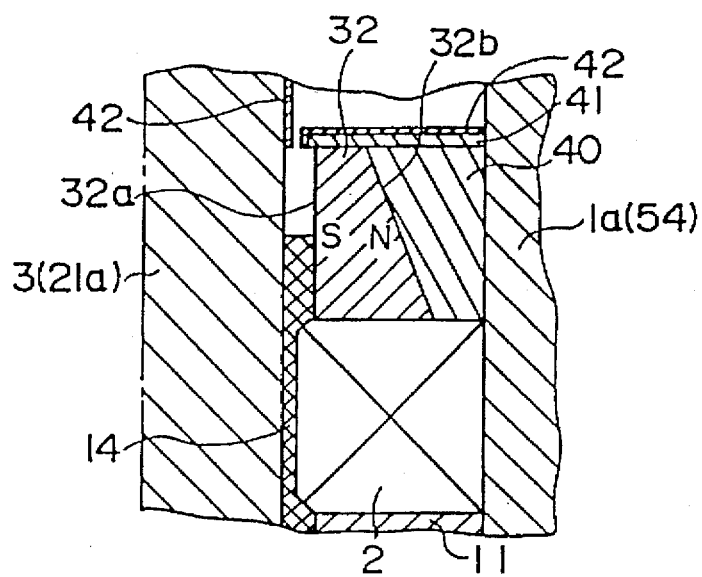
FIG. 7
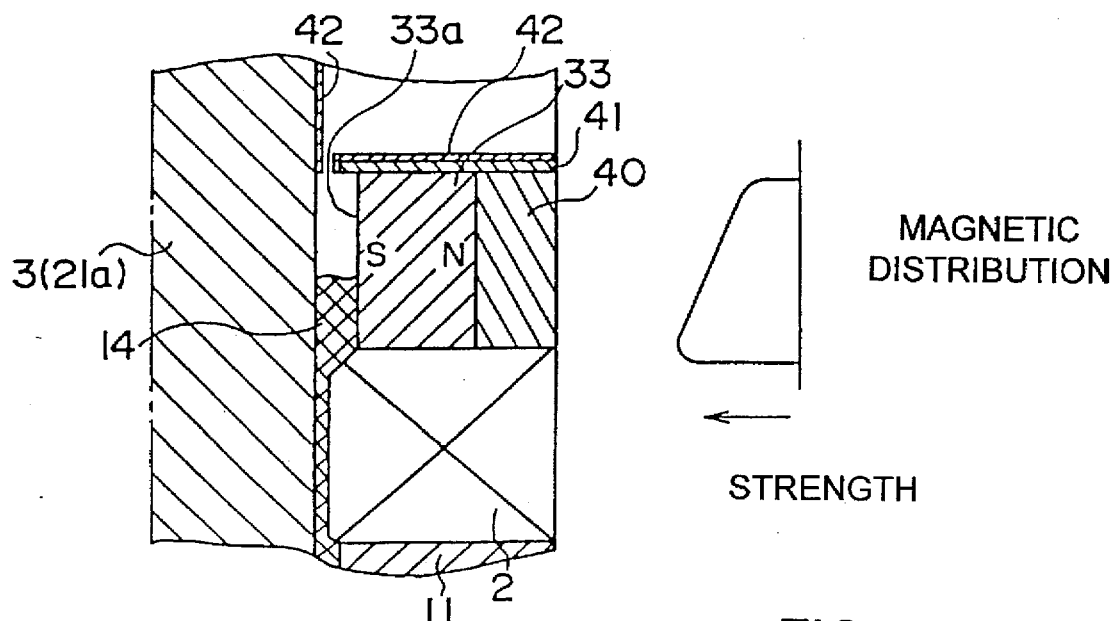
FIG. 8 a
FIG. 8 b

BEARING DEVICE WITH A PRIMARY AND SECONDARY MAGNETIC FLUID SEALING MECHANISM

BACKGROUND

A) Field of Invention

The present invention relates to a bearing device, and more particularly to a bearing device which includes a primary and secondary magnetic fluid sealing mechanism.

B) Description of Related Art

Japanese Laid-Open Patent Publication No. 62-155327 and Japanese Laid-Open Utility Model Publication No. 62-202526 show, referring to FIG. 1, a conventional bearing device which uses magnetic fluid as a lubricant. The conventional bearing device illustrated is part of a spindle motor used in a hard disk drive which has a revolving center shaft. Only the right half of the motor is shown for the purpose of clarity.

Referring to the conventional device shown in FIG. 1, a fixed member or a frame 1 of a motor housing is designed to include an integral bearing holder 1a. The bearing holder 1a extends in a vertical direction and is cylindrical in shape. The frame 1 with the bearing holder 1a has a concave shape. The frame 1 contains a closed end located at its bottom side and an open end located at its top side. A stator core 6 is fixed onto an outer peripheral surface of the bearing holder 1a, and a coil 5 is wound on the stator core 6.

Two radial bearings 2, which are secured to an inner periphery of the bearing holder 1a, receive a center shaft 3 which operates as a revolving shaft. A dynamic pressure groove is formed in either an outer peripheral surface of the center shaft 3 or an inner peripheral surface of each of the radial bearings 2. The dynamic pressure groove has, for example, a herringbone shape. A magnetic fluid 14 is filled in a slide region or clearance between the center shaft 3 and the radial bearings 2. As a result of this arrangement, a radial dynamic pressure is developed between the center shaft 3 and the radial bearings 2 to prevent a radial vibration of the center shaft 3 when it is rotated.

A thrust plate 1b is positioned in a face-to-face relationship with an end surface 3a of the center shaft 3 adjacent to the closed end of the frame 1. The thrust plate 1b forms a bottom of the frame 1. A dynamic pressure groove is formed in either the thrust plate 1b or the end surface 3a of the center shaft 3 adjacent to the closed end of the frame 1. The magnetic fluid 14 is filled in a slide region or clearance between the end surface 3a of the center shaft 3 and an upper surface of the thrust plate 1b. By this arrangement, a thrust dynamic pressure is developed between the end surface 3a of the center shaft 3 and the upper surface of the thrust plate 1b to urge the center shaft 3 toward the open end of the frame 1.

The stator core 6 has a magnetic center offset from that of a drive magnet 7. This known arrangement generates a magnetic attraction which urges the center shaft 3 toward the closed end of the frame 1. With this magnetic attraction and the above-described thrust dynamic pressure, the center shaft 3 is well balanced and free from vibration in the thrust direction when it is rotated on the thrust plate 1b.

A hub 4 is fit on an upper portion of the center shaft 3 adjacent to the open end of the frame 1 and is shaped to cover the stator 6 and the coil 5. Although not shown, a disk is loaded on an outer periphery of the hub 4. The drive magnet 7 is fixed to an inner periphery of the hub 4 and is positioned to face the core 6 such that, when a predetermined drive voltage is applied from an external power source, not shown, to the coil 5 through a flexible board 12, the hub 4 with the loaded disk is rotated. Also provided is a bearing collar 11, which is sandwiched between the radial bearings 2, and a stopper 13 which prevents the center shaft 3 from being removed from the motor.

A passage 10 is defined which interconnects an interior of the bearing holder 1a with an exterior of the bearing holder 1a. A magnetic-fluid seal 8 is present in the passage 10 and is positioned such that it is adjacent to an upper end of the bearing holder 1a above the radial bearing 2 located near the open end of the frame 1. The magnetic-fluid seal 8 includes a magnet 8b and a pair of pole pieces 8a. The pole pieces 8a are adapted to sandwich axial ends of the magnet 8b and form a magnetic circuit with the center shaft 3. Given this magnetic circuit, magnetic fluids 9 are held between an inner peripheral surface of the pole pieces 8a and an outer peripheral surface of the center shaft 3. As a result, the magnetic-fluid seal 8 prevents leakage of the magnetic fluid 14 filled within the bearing holder 1a and further prevents entry of dust or other particles into the interior of the radial bearings 2.

FIG. 2 shows another conventional bearing device which uses a magnetic fluid as a lubricant. In lieu of the magnetic-fluid seal 8 shown in FIG. 1, the device shown in FIG. 2 uses a magnet 16 which is placed on a radial bearing 2 adjacent to an open end of a frame. The magnet 16 has axially opposite magnetic poles and provides an open magnetic field to hold the magnetic fluid 14.

The motors shown in FIGS. 1 and 2 illustrate spindle motors that must be used in a clean air environment. It is, therefore, imperative to prevent the magnetic fluid 14 from leaking if the motor is subject to vibration, shock, centrifugal forces, or if an orientation of the motor is changed. It is also necessary to prevent the magnetic fluid 14 from leaking when (i) changes in volume of the magnetic fluid 14 occur due to variations in atmospheric pressure, temperature or part sizes, or (ii) changes in the amount of magnetic fluid 14 filled in the beating occur.

In certain environments, however, the devices shown in FIGS. 1 and 2 become ineffective at retaining the magnetic fluid 14. In particular, when the motors shown in FIGS. 1 and 2 are shipped by an airplane, the magnetic fluid 14 is likely to leak from the device due to substantial changes in atmospheric pressure and temperature.

Additionally, referring to FIG. 2, if upper portions of the center shaft 3 or the bearing holder 1a becomes contaminated by magnetic fluid 14 when a leak occurs, the magnetic fluid 14 tends to remain on the contaminated member and cannot be attracted back to the magnet 16. This results in an increase of gases outside of the device and also contributes to a shortage of the magnetic fluid 14 which deteriorates the reliability of the bearing. For these reasons, there has been a longstanding need for a bearing device which can prevent the magnetic fluid 14 from leaking.

OBJECTS AND SUMMARY OF THE INVENTION

It is therefore an object of the invention to provide a bearing device which can prevent magnetic fluid from leaking, reduce contamination outside of the bearing device caused by dust and gases, and prevent a shortage of magnetic fluid from occurring within the bearing device.

In accordance with one aspect of the invention, a bearing device used in a motor is described, where the motor includes a shaft made of a magnetic material and a frame made of a magnetic material. This bearing device includes: a bearing connected to one of the shaft and the frame; a magnetic fluid filled in a space between the shaft and the frame; a primary magnetic fluid sealing means for sealing said magnetic fluid, where the primary magnetic fluid sealing means produces an axial magnetic flux density gradient in the space which increases unidirectionally in a direction away from an open end of the frame, and the primary magnetic fluid sealing means is located closer to the open end of the frame than the bearing; and, a secondary magnetic fluid sealing means for sealing the magnetic fluid, where the secondary magnetic fluid sealing means is located closer to the open end of the frame than the primary magnetic fluid sealing means.

In accordance with another aspect of the invention, a bearing device is described which includes: a radial bearing fixed to one of a fixed member and a revolving member, where the radial bearing is adapted to rotatably support the revolving member; a magnetic fluid filled in a region between the radial bearing and the revolving member; a magnet mounted to one of the fixed member and the revolving member, where the magnet is located closer to an open end of the frame than the radial bearing; a magnetic body mounted to one of the fixed member and the revolving member, where the magnetic body is oriented to radially face the magnet; and, a magnetic fluid sealing plate which is located closer to the open end of the frame than the magnet, where the magnetic fluid sealing plate is made of a non-magnetic material with a surface that allows the magnetic fluid coming into contact with the surface to form into one of a bead or a droplet. In this device, the magnetic body and the magnet collectively form a magnetic circuit with an axial magnetic flux density gradient in a space defined between the magnetic body and the magnet that increases unidirectionally in a direction away from the open end of the frame.

Additional objects and advantages of the invention will be apparent from the foregoing general description and following detailed description and drawings. It is to be understood that the descriptions are exemplary and explanatory only and are not restrictive of the invention as claimed.

BRIEF DESCRIPTION OF THE DRAWINGS

The accompanying drawings are included to provide an understanding of the invention and constitute a part of the specification.

FIG. 7 illustrates a transverse sectional view showing a principal part of a bearing device according to a fourth embodiment of the present invention;

FIGS. 8(a) and 8(b) illustrate a fifth embodiment of the present invention where, FIG. 8(a) is a transverse sectional view showing a principal part of a bearing device, and FIG. 8(b) illustrates a magnetic distribution of a magnet shown in FIG. 8(a);

DETAILED DESCRIPTION OF THE INVENTION

Reference will now be made in detail to the numerous embodiments of the invention as illustrated in the accompanying drawings.

Figure 1:
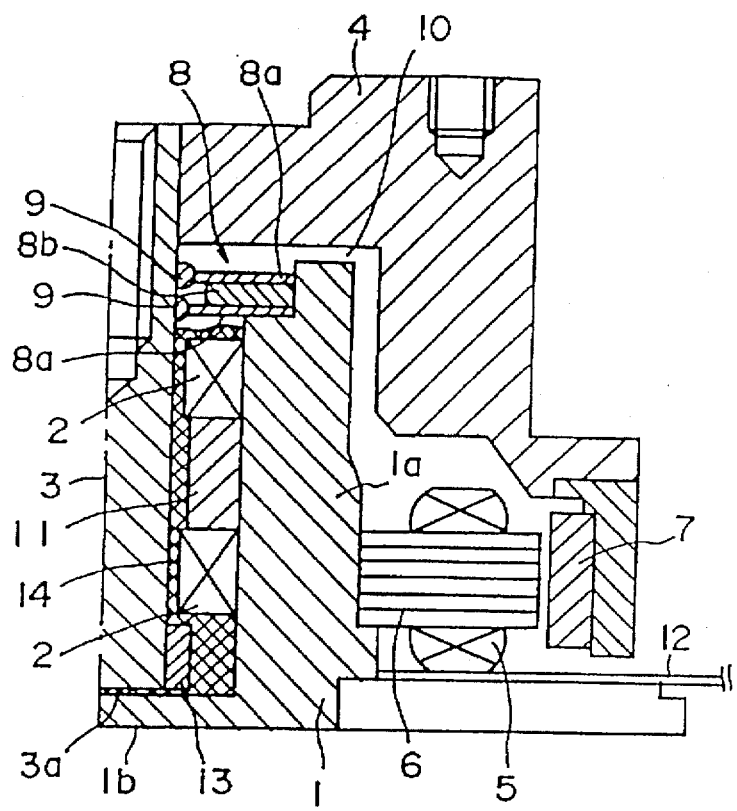
FIG. 1 illustrates a conventional bearing device used in a revolving center shaft type motor for a hard disk drive.
Figure 2:
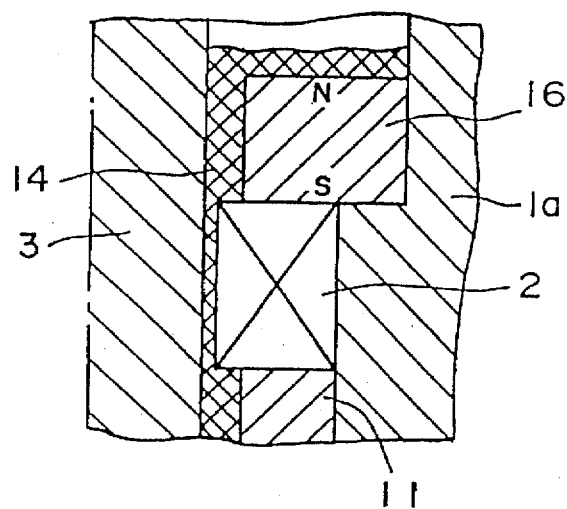
FIG. 2 illustrates another example of a magnetic fluid holding structure used in FIG. 1.
Figure 3:
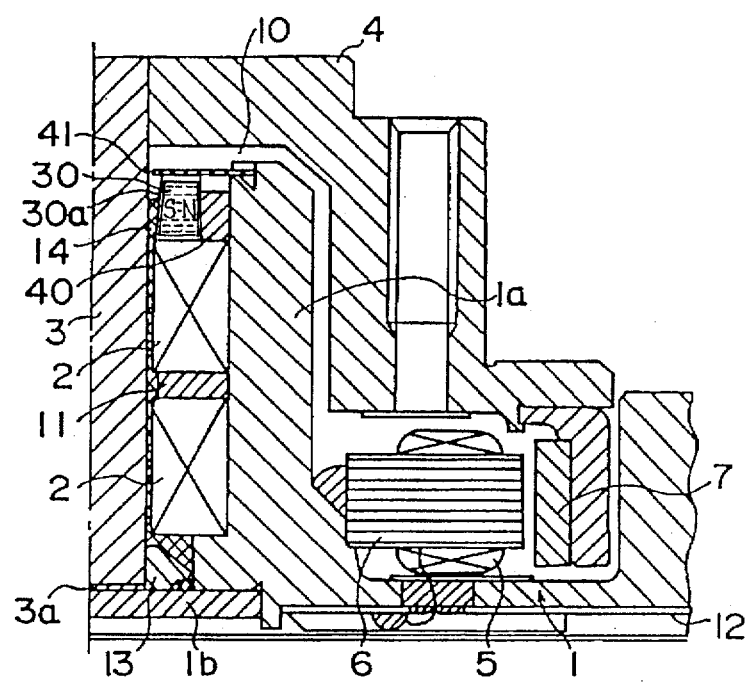
FIG. 3 illustrates a transverse sectional view of a fixed center shaft type motor for use in a hard disk drive with a bearing device according to a first embodiment of the present invention.
Figure 4:
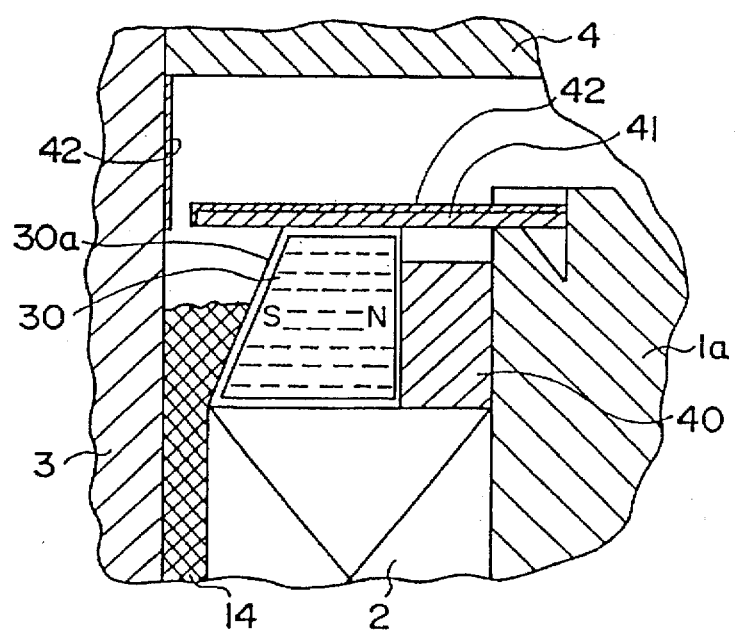
FIG. 4 illustrates an enlarged view of a principal part of the bearing device shown in FIG. 3.

FIG. 3 is a transverse sectional view of a bearing device according to a first embodiment of the present invention which is incorporated into a fixed center shaft spindle motor used in a hard disk drive. FIG. 4 is an enlarged view of a principal part of the bearing device shown in FIG. 3. Parts which are identical to and function in the same way as those referred to in FIGS. 1 and 2 are given like reference numerals and will not be described herein.

Referring to FIG. 3, a center shaft 3 and a radial bearing 2 adjacent to an open end of a frame 1 are both made of a magnetic material. A magnet 30, which is placed on an end of the radial bearing 2 adjacent to the open end of the frame 1, has radial magnetic poles. A retainer 40 is fixed between the radial bearing 2 adjacent to the open end of the frame 1, the magnet 30, and a bearing holder 1a. The magnet 30, center shaft 3, radial bearing 2 adjacent to the open end of the frame 1, and retainer 40 collectively form a magnetic circuit.

The magnet 30 has an inner surface 30a which maintains a face-to-face relationship with the center shaft 3. The surface 30a of the magnet 30 is inclined toward an outer periphery of the center shaft 3 in a direction away from the open end of the frame 1 or, in other words, a downward direction.

Figure 13:
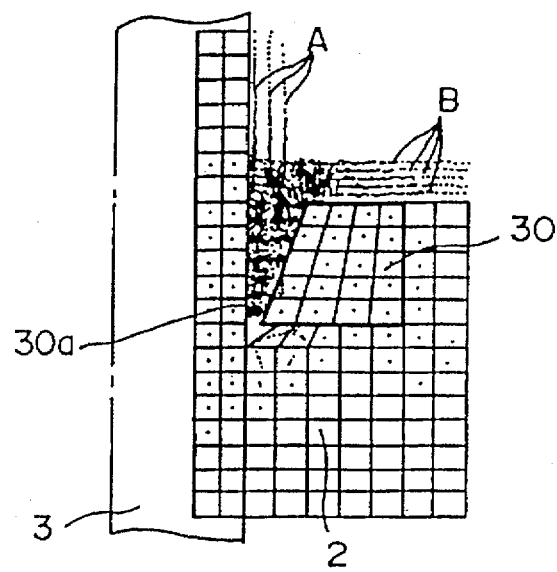
FIG. 13 illustrates a magnetic flux around a magnet and magnetic body.
Figure 14:
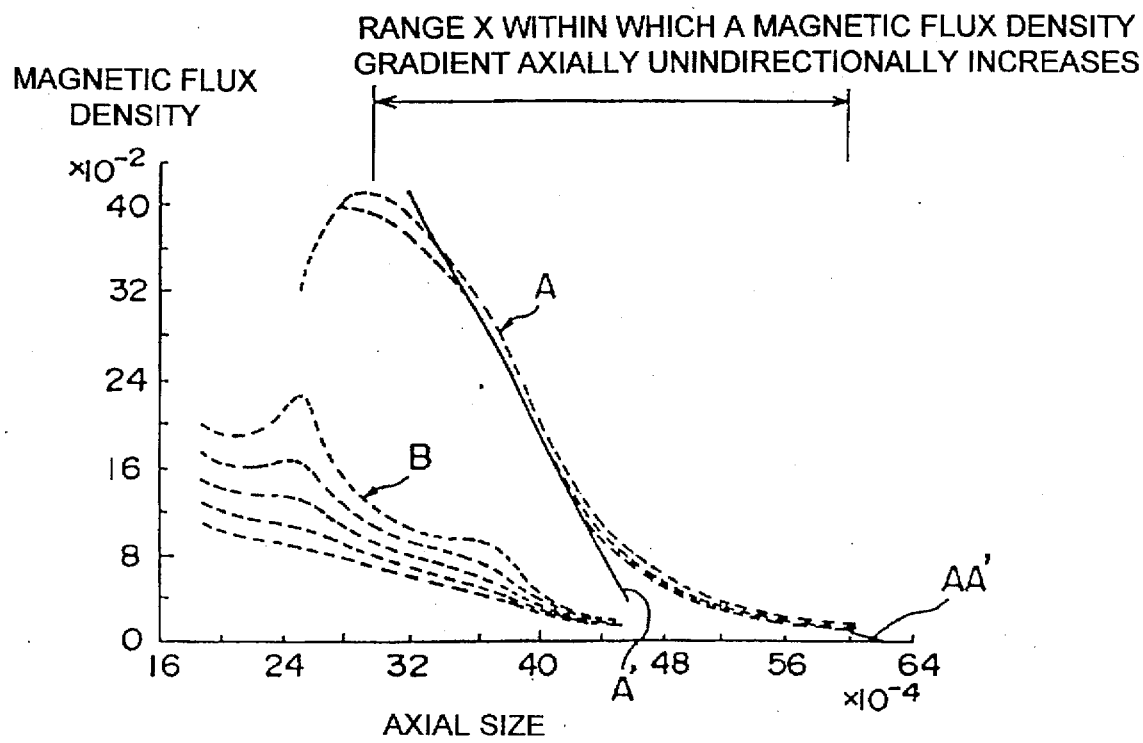
FIG. 14 is a graph showing a density distribution of magnetic flux indicated by reference numerals A and B in FIG. 13.

Referring to FIGS. 13 and 14, by forming the magnetic circuit between the inclined surface 30a of the magnet 30 and the center shaft 3, a magnetic flux A in a space between the magnet 30 and the center shaft 3 and a magnetic flux B in a space around an end of the magnet 30 adjacent to the open end of the frame 1 have an axially distributed density. Specifically, an axial magnetic flux density gradient in a space between the magnet 30 and the center shaft 3 is present within a range indicated by X in FIG. 14, such that an axial magnetic flux density gradient increases in a direction away from the open end of the frame 1.

A unidirectional magnetic flux density gradient, substantially corresponding to a sharp unidirectional magnetic flux density gradient indicated by reference numeral A' in FIG. 14, generally provides a magnetic force sufficient to safely retain the magnetic fluid 14 if the volume of the magnetic fluid 14 is changed due to changes in atmospheric pressure, temperature, part sizes or changes in the amount of magnetic fluid 14 filled in the bearing. Also, a unidirectional magnetic flux density gradient, substantially corresponding to a unidirectional magnetic flux density gradient indicated by reference numeral AA' in FIG. 14, provides a magnetic force sufficient to return the magnetic fluid 14 if the device is subject to vibration, shock, centrifugal forces, or if an orientation of the device is changed. This is due to the fact that a relatively large unidirectional magnetic flux density gradient is present at a location remote from the magnet 30.

As a result of these magnetic flux density gradients, the magnetic fluid 14 will generally stay in the device, thereby making it is possible to reduce contamination from outside of the device caused by dust and gases, and to avoid shortages of the magnetic fluid 14 due to leakage. This arrangement is particularly effective when the device is shipped by an airplane where a sudden change in atmospheric pressure and temperature occurs.

Referring again to FIG. 3, the radial bearing 2 adjacent to the open end of the frame 1, the retainer 40, the center shaft 3, and the magnet 30 collectively form a magnetic circuit to provide the magnetic forces described above. This arrangement more effectively holds the magnetic fluid 14 as compared to an arrangement where a magnetic circuit is formed only by the center shaft 3 and the magnet 30.

The unidirectional magnetic flux density gradient is preferably as long and sharp as possible. Also, the volume of a space within which the magnetic fluid 14 is contained is preferably as large as possible. As such, a preferred unidirectional magnetic flux density gradient and volume can readily be obtained by changing an angle of inclination of the magnet 30.

Referring to FIG. 4, a plate 41 is mounted to one end of the magnet 30 adjacent to the open end of the frame 1 to further prevent the magnetic fluid 14 from leaking. This magnetic fluid sealing plate 41 is made of a nonmagnetic material and maintains an inner peripheral surface which terminates at a point adjacent to an outer peripheral surface of the center shaft 3.

The magnetic fluid sealing plate 41 reduces the size of a passage within the bearing holder 1a to prevent the magnetic fluid 14 from leaking notwithstanding of the magnetic forces resulting from the unidirectional magnetic flux density gradient.

Layers 42 are attached to the magnetic fluid sealing plate 41 and the center shaft 3. The layer 42 attached to the center shaft 3 extends toward the open end of the frame 1. The layers 42 are made of a material such that a contact angle between the layers 42 and the magnetic fluid 14 is greater than a contact angle between the magnet 30 and the magnetic fluid 14. In particular, the layers 42 are made of a polymeric material such as TEFLON, polytrifluoroethylene, polyvinylidene fluoride, polyvinyl fluoride or other materials which will allow the magnetic fluid 14 to form into beads or droplets. Or, in other words, the layers 42 provide a slippery surface on which the magnetic fluid 14 easily forms into beads or droplets.

Thus, if the magnetic fluid 14 leaks from between the magnetic fluid sealing plate 41 and the center shaft 3 such that it comes into contact with the layers 42, the layers 42 are unlikely to become wetted by the magnetic fluid 14, given that the magnetic fluid 14 will form into beads or droplets and return to the influence of the magnetic forces resulting from the above-described unidirectional magnetic flux density gradient. It is therefore possible to more effectively prevent leakage of the magnetic fluid 14 by use of the layers 42 in combination with the magnetic fluid sealing plate 41, as compared to a sole use of the magnetic fluid sealing plate 41.

In lieu of polymeric material, the layers 42 may include a low energy surface made, for example, of fluorocarbon and hydrocarbon. The layers 42 may also include a gasoline layer made, for example, of TEFLON resin or isostearic acid when the magnetic fluid is ester. The gasoline layer is found to offer the same advantages as the polymeric material described above.

Figure 5:
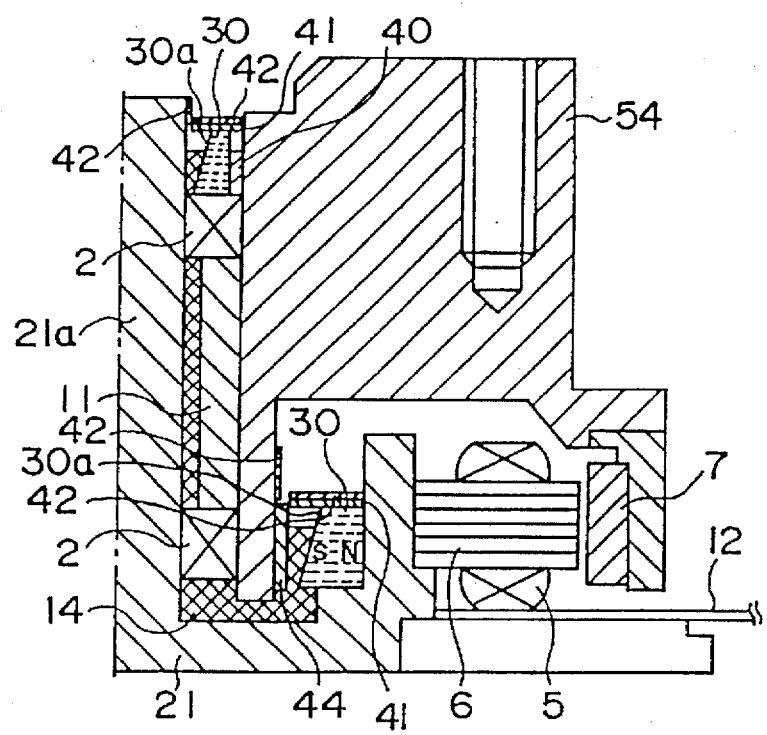
FIG. 5 illustrates a transverse sectional of a fixed center shaft type motor for use in a hard disk drive into which a bearing device according to a second embodiment of the present invention is incorporated.

FIG. 5 is a transverse sectional view of a fixed center shaft type spindle motor for use in a hard disk drive into which a bearing device according to a second embodiment of the present invention is incorporated. Parts which are identical to and function in the same way as those referred to in the first embodiment are given like reference numerals and will not be described herein.

In the second embodiment, the motor is of the type in which a center shaft 21a is fixed to a frame 21. The frame 21 is made of a magnetic material and has two open ends. In order to prevent magnetic fluid 14 from leaking from the open ends, magnets 30 are located closer to the open ends of the frame 21 than radial bearings 2. In order to form the same magnetic circuit as in the first embodiment, the center shaft 21 maintains a face-to-face relationship with the upper magnet 30. Additionally, a member 44, or hub 54 when the member 44 is not present, maintains a face-to-face relationship with the lower magnet 30. Both the member 44 and hub 54 are made of a magnetic material.

As in the first embodiment, a magnetic fluid sealing plate 41 is placed on an end of the magnets 30. Layers 42 are attached to the magnetic fluid sealing plate 41, center shaft 21a and hub 54. The layers 42 which are attached to the center shaft 21a and hub 54 extend toward the open ends of frame 21. The layers 42 are made of a material such that a contact angle between the layers 42 and the magnetic fluid 14 is greater than a contact angle between the magnet 30 and the magnetic fluid 14. The second embodiment offers the same advantages and benefits of the first embodiment.

Figure 6:
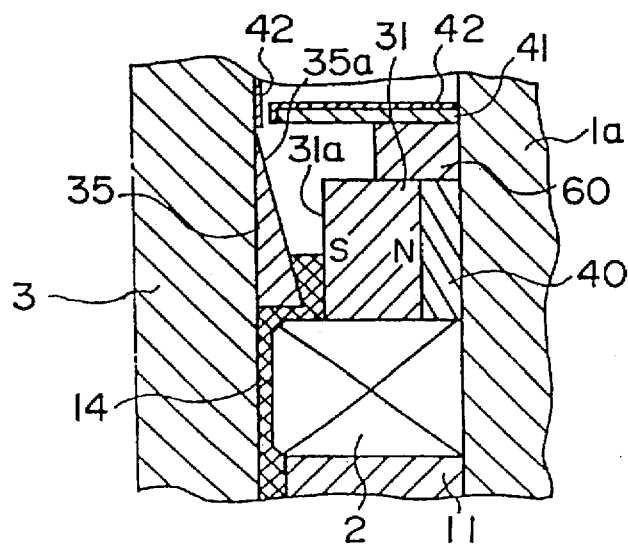
FIG. 6 illustrates a transverse sectional view showing a principal part of a bearing device according to a third embodiment of the present invention.

FIG. 6 is a transverse sectional view showing a principal part of a bearing device according to a third embodiment of the present invention. In the third embodiment, one side 31a of a magnet 31, which is not inclined, maintains a face-to-face relationship with an outer peripheral surface 35a of a magnetic body 35 fixed to an outer peripheral surface of the center shaft 3. The outer peripheral surface 35a of the magnetic body 35 is inclined toward the side 31a of the magnet 31 in a direction away from the open end of the frame 1 or, in other words, a downward direction. The magnetic fluid sealing plate 41 and the layers 42 are provided in the same manner as in the first embodiment. Also, a spacer 60 is provided for axially separating the magnetic fluid sealing plate 41 from the magnet 31.

Under this arrangement, the magnet 31, magnetic body 35, center shaft 3, radial bearing 2, and retainer 40 collectively form a magnetic circuit. This magnetic circuit provides an axial magnetic flux density gradient in a space between the magnetic body 35 and the magnet 31 which increases unidirectionally in a direction away from the open end of the frame 1 as in the first embodiment. The unidirectional magnetic flux density gradient, as well as the magnetic fluid sealing plate 41 and the layers 42, offer the same advantages as in the first embodiment.

FIG. 7 is a transverse sectional view showing a principal pan of a bearing device according to a fourth embodiment of the present invention. The bearing device according to the fourth embodiment differs from that of the first embodiment in that, in the fourth embodiment, a front side 32a of a magnet 32 which which maintains in a face-to-face relationship with the center inclined. Rather, a rear side 32b of the magnet 32 is inclined such that the radial thickness of the magnet 32 increases in a direction away from the open end of the frame 1.

In the fourth embodiment, the magnet 32, center shaft 3, radial bearing 2, frame 1, and retainer 40 collectively form a magnetic circuit. This magnetic circuit provides an axial magnetic flux density gradient in a space between the center shaft 3 and the magnet 32 which increases unidirectionally in a direction away from the open end of the frame 1 as in the first embodiment. The unidirectional magnetic flux density gradient, as well as the magnetic fluid sealing plate 41 and the layers 42, offer the same advantages as in the first embodiment.

FIGS. 8(a) and 8(b) illustrate a fifth embodiment of the present invention. Specifically, FIG. 8(a) is a transverse sectional view showing a principal part of a bearing device and FIG. 8(b) illustrates a magnetic distribution of a magnet shown in FIG. 8(a). The bearing device of the fifth embodiment differs from that of the first embodiment in that, in the fifth embodiment, a front side 33a of a magnet 33, which maintains a face-to-face relationship with a surface of a center shaft 3, is not inclined. Rather, as shown in FIG. 8(b), a magnetic strength of the magnet 33 increases in a direction away from the open end of the frame 1.

This arrangement forms an axial magnetic flux density gradient in a space between the center shaft 3 and the magnet 33 which increases unidirectionally in a direction away from the open end of the frame 1. The unidirectional magnetic flux density gradient, as well as the magnetic fluid sealing plate 41 and the layers 42, offer the same advantages as in the first embodiment.

Figure 9:
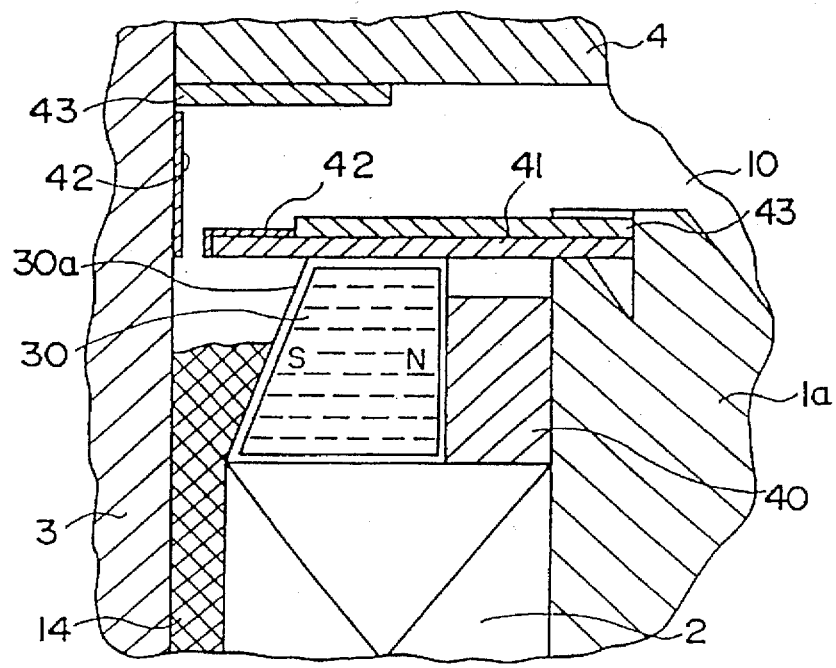
FIG. 9 illustrates a transverse sectional view showing a principal part of a bearing device according to a sixth embodiment of the present invention.

FIG. 9 is a transverse sectional view showing a principal part of a bearing device according to a sixth embodiment of the present invention. In the sixth embodiment, oil absorbent members 43, in addition to the magnetic fluid sealing plate 41 and the layers 42 shown in the first embodiment, are provided in the passage 10 above the magnet 30. In this embodiment, the oil absorbent members 43 are positioned on an upper surface of the magnetic fluid sealing plate 41 and above a layer 42 positioned on center shaft 3.

Given the presence of the oil absorbent members 43, if the magnetic fluid 14 tends to leak, notwithstanding the magnetic attraction resulting from the unidirectional magnetic flux density gradient and the beading characteristics of layers 42, the oil absorbent members 43 will rapidly absorb that magnetic fluid 14 and prevent leakage.

Figure 10:
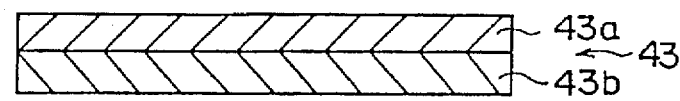
FIG. 10 illustrates a transverse sectional view of an oil absorbent member shown in FIG. 9.

Referring to FIG. 10, the oil absorbent members 43 are in the form of an unwoven fabric made, for example, of polypropylene and polyester. In particular, the oil absorbent member 43 includes a front oil absorbent layer 43a and a rear adhesive layer 43b. The oil absorbent members 43 may be replaced by a solidifying agent which is made of a long-chain polyacrylate or gelatinizer.

Figure 11:
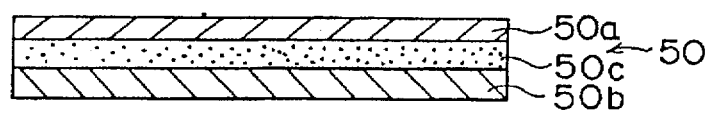
FIG. 11 illustrates a transverse sectional view of another form of an oil absorbent member shown in FIG. 9.

Referring to FIG. 11, the oil absorbent member 43 shown in FIG. 10 may be replaced by an oil absorbent member 50. The oil absorbent member 50 has a front oil absorbent layer 50a, a rear adhesive layer 50b, and a solidifying layer 50c inserted between the oil absorbent layer 50a and the adhesive layer 50b. The solidifying layer 50c is made, for example, of a long-chain polyacrylate or gelatinizer.

Figure 12:
FIG. 12 illustrates a transverse sectional view of still another form of an oil absorbent member shown in FIG. 9.

Referring to FIG. 12, an oil absorbent member 51 may also be employed. The oil absorbent member 51 includes an oil absorbent layer 50a with the above solidifying agent, and an adhesive layer 51b.

The oil absorbent members 43, 50 and 51 are applicable to a bearing device which uses magnetic attraction resulting from the unidirectional magnetic flux density gradient and the magnetic fluid sealing plate 41, but without the provision of the layers 42.

Although FIGS. 3 through 14 describe preferred embodiments of the invention made by the inventors, the invention is not limited thereto. It is to be understood that various changes may be made to these embodiments without departing from the scope of the invention. For example, the magnets 30 through 33 may be fixed to the center shaft 3 or, referring to the second embodiment as shown in FIG. 5, the upper magnet 30 may be fixed to the center shaft 21a and the lower magnet 30 may be fixed to the hub 54. Also, a magnetic body may be mounted in a location to face the magnets 30 through 33.

In the foregoing embodiments, the layers 42 are attached to (i) portions of the magnetic fluid sealing plate 41 to maintain a face-to-face relationship with the center shaft 3, and (ii) the center shaft 3 adjacent to the open end of frame 1. Although these places are considered to be most effective, the layers 42 may be attached to other places as well. Also, in the foregoing embodiments, the layers 42 are attached to both the magnetic fluid sealing plate 41 and the center shaft 3, but may be attached to only one of these parts without losing any advantage or benefit. Moreover, it may not be necessary to provide any of the layers 42 if either the magnetic fluid sealing plate 41 or the center shaft 3 is made of a material such that a contact angle between that member and the magnetic fluid 14 is greater than a contact angle between the magnets 30 through 33 and the magnetic fluid 14.

The foregoing embodiments employ dynamic pressure type bearings, however, other types of bearings may be used as well. Also, in the foregoing embodiments, the bearing device was incorporated into a spindle motor for a hard disk drive, however, the bearing device may be incorporated into a motor for a laser beam printer or other motors.

There are many advantages associated with the preferred embodiments described above in FIGS. 3 through 14. For example, in the bearing device of the first embodiment shown in FIGS. 3 and 4, a unidirectional magnetic flux density gradient increases in a direction opposite to the open end of the frame 1 and provides a magnetic force to hold the magnetic fluid 14. Specifically, if the volume of the magnetic fluid is changed due to a change in atmospheric pressure, temperature, part sizes, or when a required amount of the magnetic fluid is not filled in the device, the unidirectional magnetic flux density gradient will provide a magnetic force to retain the magnetic fluid 14. Also, if the device is subject to vibration, shock, centrifugal forces, or if an orientation of the device is changed, the unidirectional magnetic flux density gradient again will provide a magnetic force to retain the magnetic fluid 14.

However, if the magnetic fluid 14 leaks, notwithstanding the magnetic attraction resulting from the unidirectional magnetic flux density gradient, the magnetic fluid sealing plate 41 prevents leakage of that magnetic fluid. It is thus possible, when using the bearing device of the first embodiment, to prevent the magnetic fluid from leaking out of the device and, reduce contamination from outside the device caused by dust and gas, and to avoid shortages of the magnetic fluid.

Additionally, according to the foregoing embodiments, the bearing device provides layers 42 which are made of a material such that a contact angle between this material and the magnetic fluid is greater than a contact angle between the magnet and the magnetic fluid. This feature allows the magnetic fluid 14 which comes into contact with the layers 42 to form into beads or droplets. Thus, the layers 42 are unlikely to become wetted by the magnetic fluid 14 given that any magnetic fluid 14 which comes into contact with the layers 42 will form into beads or droplets and return to the influence of a magnetic force resulting from the unidirectional magnetic flux density gradient.

Also, according to the fourth embodiment of the invention, the bearing device provides oil absorbent members adapted to rapidly absorb the magnetic fluid if any leakage of the magnetic fluid occurs.

Figure 15:
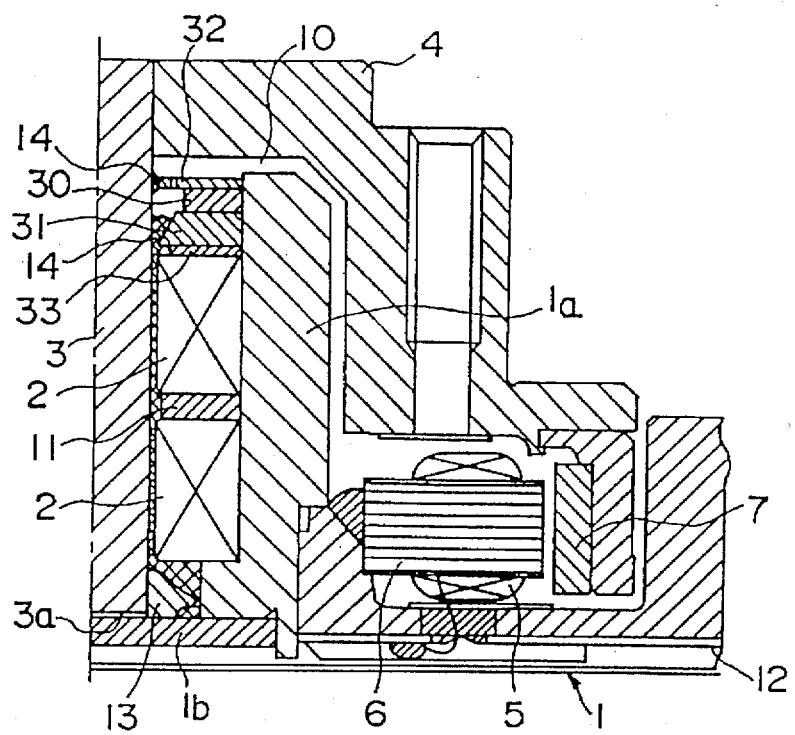
FIG. 15 illustrates a cross-sectional view of a motor for use in a hard disk which includes a dynamic pressure bearing device according to a seventh embodiment of the invention.
Figure 16:
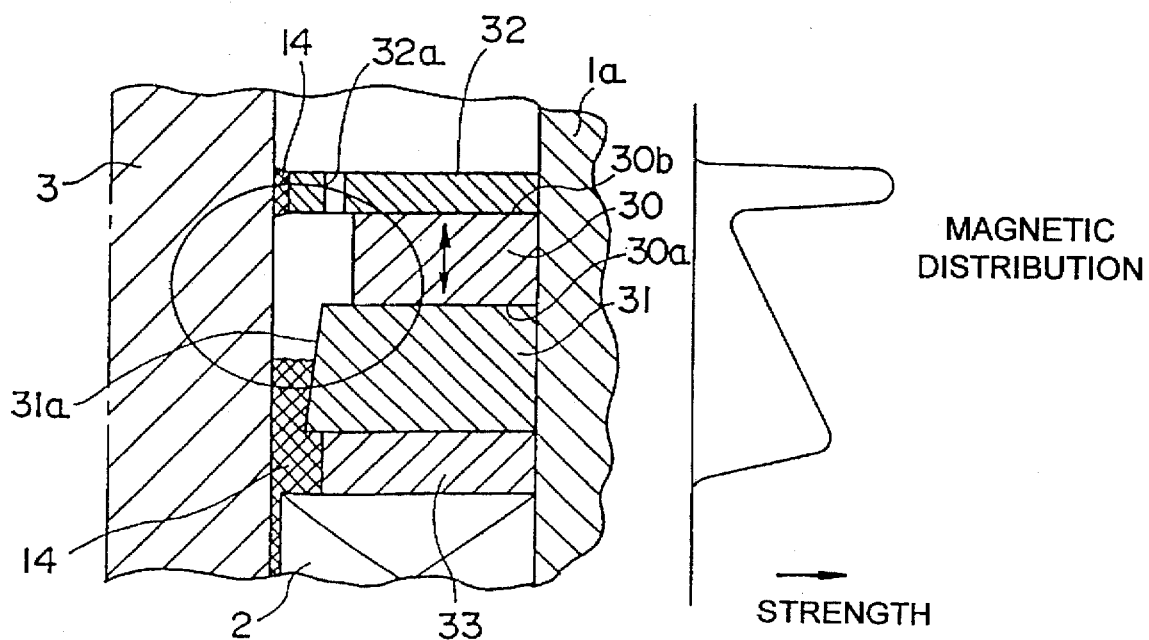
FIGS. 16(a) and 16(b) respectively illustrate an enlarged view of a part of FIG. 15, and a diagram of a distribution of magnetic flux density in a space defined by the device shown in FIG. 16(a)

FIG. 15 is a cross sectional view of a spindle motor for use in a hard disk drive having a rotary central shaft and fixed radial bearings which includes a device according to a seventh embodiment of the invention. FIG. 16(a) is an enlarged view of a part of FIG. 15, and FIG. 16(b) is a diagram showing a distribution of a magnetic flux density a space defined by the device shown in FIG. 16(a).

Referring to FIG. 15, the motor includes a central shaft 3 made of a magnetic material, and an axially magnetized annular magnet 30 situated above a radial bearing 2 near an open end of a frame 1. In particular, a first magnetic member 31 is mounted to an inner end surface 30a of the magnet 30, and a second magnetic member 32 is mounted to an outer end surface 30b of the magnet 30. Additionally, a nonmagnetic member 33 is disposed between the first magnetic member 31 and the radial bearing 2 near the open end of the frame 1. The first and second magnetic members 31 and 32, magnet 30 and nonmagnetic member 33 are securely fit to an inner peripheral surface of a bearing holder 1a, such that none of these members have an end surface contacting the central shaft 3.

Referring to FIG. 16(a), the first and second magnetic members 31 and 32, magnet 30, and central shaft 3 form a magnetic circuit. An inner peripheral surface 31a of the first magnetic member 31, which faces the central shaft 3, is inclined to approach an outer periphery of the central shaft 3. The inclined surface 31a of the first magnetic member 31 provides a magnetic flux in a space defined by the central shaft 3, first magnetic member 31 and the magnet 30 (or in a space surrounded by the central shaft 3, first and second magnetic members 31 and 32, and magnet 30) to have a unidirectional gradient of magnetic flux density which increases as shown in FIG. 16(b). Additionally, given the profile shown in FIG. 16(b), the central shaft 3 and second magnetic member 32 retain a magnetic fluid 14 between their respective surfaces.

As a result of the magnetic circuit and unidirectional gradient of magnetic flux density described above, the magnetic fluid 14 is prevented from leaking, even if the surface level of the magnetic fluid 14 may change as a result of variations in atmospheric pressure, temperature, part sizes, or variations in the amount of the magnetic fluid 14 filled in the device. Also, even if a vibration, impact, centrifugal force, or change in orientation of the device occurs, the magnetic fluid 14 is prevented from leaking. Moreover, given that the magnetic fluid 14 is held between the central shaft 3 and the second magnetic member 32 to form a magnetic fluid seal, it is possible to prevent any evaporation or deterioration of the magnetic fluid 14.

It is desirable that the unidirectional gradient of magnetic flux density, as described above, be axially long and sharp and that a space having a large volume be available for holding the magnetic fluid. The desired gradient and space are easily available by altering the inclination of the first magnetic member 31. In this regard, the inner peripheral surface 31a of the first magnetic member 31 preferably has an axial length of at least 0.5 mm.

The nonmagnetic member 33 is provided between the first magnetic member 31 and the radial bearing 2 to increase the axial magnetic flux density in the space defined by the central shaft 3, first magnetic member 31 and the magnet 30. However, the nonmagnetic member 33 can be omitted if the radial bearing 2 is made of a nonmagnetic material.

The magnetic fluid seal formed between the central shaft 3 and the second magnetic member 32 is likely to allow air to stay in the space surrounded by the first and second magnetic members 31 and 32, the magnet 30 and the central shaft 3. Such air is likely to expand under the influence of atmospheric pressure and temperature, and thus deteriorate the effectiveness of the seal formed between the central shaft 3 and the second magnetic member 32. As a result, the second magnetic member 32 is provided with a through hole 32a, as shown in FIG. 16(a) to allow air to escape while simultaneously retaining the magnetic fluid 14. This arrangement gives the seal an improved effectiveness.

Figure 17:
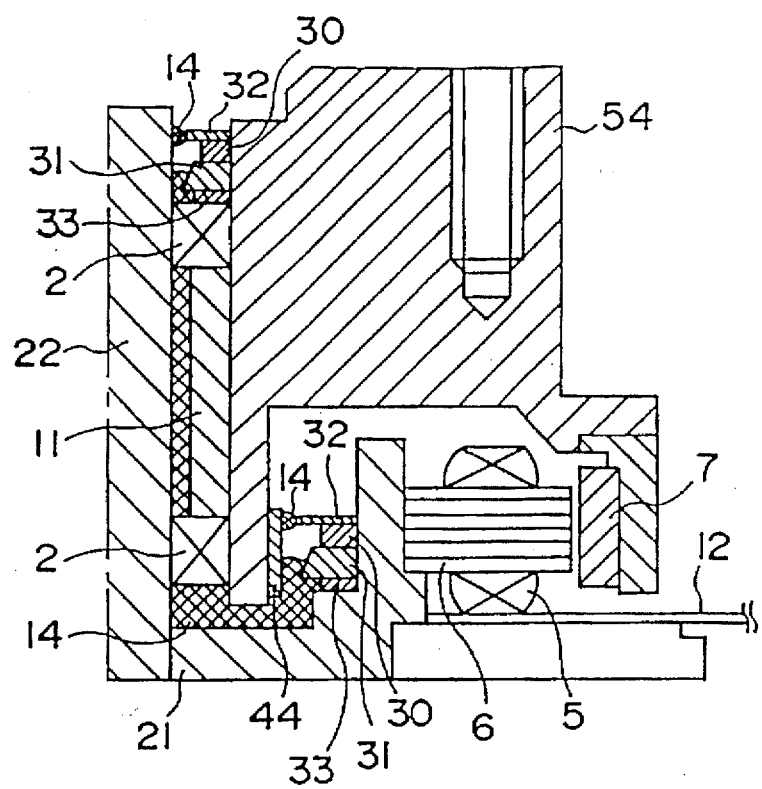
FIG. 17 illustrates is a cross-sectional view of a spindle motor for a hard disk drive which includes a dynamic pressure bearing device according to an eighth embodiment of the invention.

FIG. 17 is a cross sectional view of a spindle motor for use in a hard disk drive having a fixed central shaft and rotary radial bearings which includes a device according to a eighth embodiment of this invention. Like numerals are used in FIG. 17 for those parts which are identical in construction or function to those described in connection with the seventh embodiment.

The motor shown in FIG. 17 is of the type having a central shaft 22 made of a magnetic material which is fixed to frame 21. A first magnetic member 31, a second magnetic member 32, a magnet 30, and a nonmagnetic member 33 are mounted above two radial bearings 2 located near open ends of the motor. These magnetic members are provided to prevent magnetic fluid 14 from leaking through either of the open ends. A member 44 facing a lower first magnetic member 31, or a hub 54 if the member 44 is not employed, is made of a magnetic material to form a magnetic circuit which is similar to that formed in the device according to the seventh embodiment. The same results can be obtained from the eighth embodiment as from the seventh embodiment.

Figure 18:
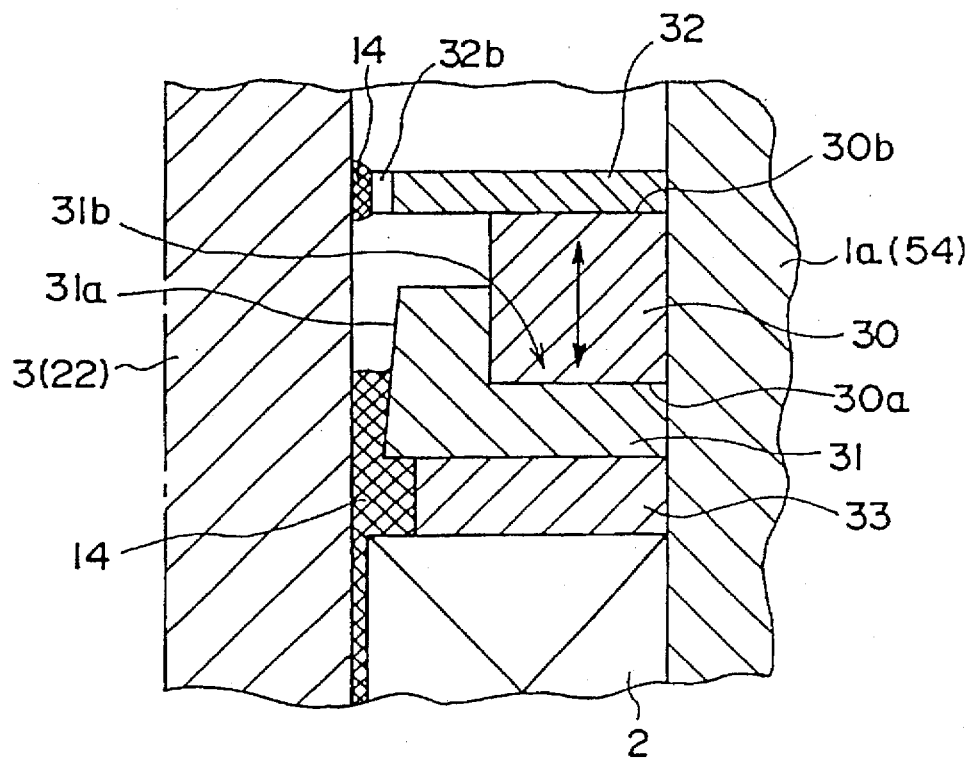
FIG. 18 illustrates a cross-sectional view of an essential part of a dynamic pressure bearing device according to a ninth embodiment of the invention.

FIG. 18 is a cross sectional view of an essential part of a dynamic pressure bearing device according to a ninth embodiment of this invention. The device shown in FIG. 18 differs from the sixth and seventh embodiments in that a side of a first magnetic member 31 which faces the open end of the device has a recess 31b in which a magnet 30 is fitted. The same results can be obtained from the ninth embodiment as from those described for the seventh and eighth embodiments. Additionally, the device shown in FIG. 18 has the advantage of being smaller in axial length.

In the ninth embodiment, a second magnetic member 32 has an opening 32b through which air is allowed to escape from a space surrounded by the first and second magnetic members 31 and 32, magnet 30 and a central shaft 3. Similar to the seventh embodiment shown in FIG. 16, the ninth embodiment provides a seal with an improved effectiveness.

Figure 19:
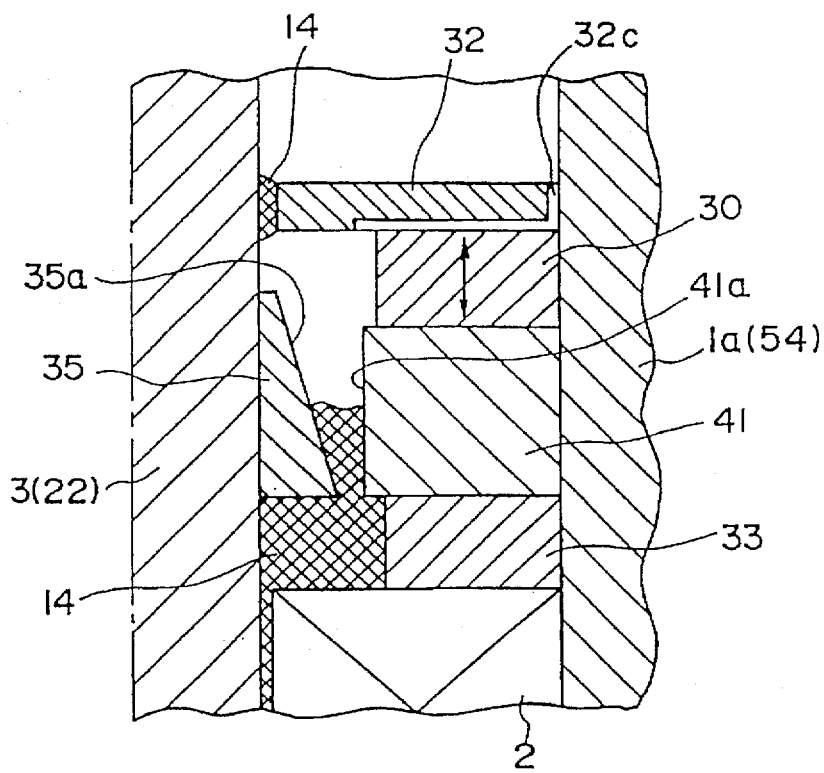
FIG. 19 illustrates a cross-sectional view of an essential part of a dynamic pressure bearing device according to a tenth embodiment of the invention.

FIG. 19 is a cross sectional view of an essential part of a dynamic pressure bearing device according to a tenth embodiment of this invention. In this embodiment, a surface 41a of a first magnetic member 41 which faces a central shaft 3 is not inclined. However, a surface 35a of an annular magnetic body 35 which is secured to the outer periphery of the shaft 3 which faces the first magnetic member 41 is inclined to approach the surface 41a of the first magnetic member 41.

The same results can be obtained from this device as from those according to the seventh through ninth embodiments already described, since a magnetic flux is produced in a space defined by the magnetic body 35, first magnetic member 41, a magnet 30, and a second magnetic member 32 which has a unidirectional gradient of axial density that increases toward the bearing 2. Also, the second magnetic member 32 has an opening 32c through which air is allowed to escape, which provides a seal with an improved effectiveness.

The openings 32a, 32b, or 32c, as described above, have a magnetic flux density which does not exceed a half of the maximum magnetic flux density in the area between the first magnetic member and the central shaft 3 or between the second magnetic member and the central shaft 3.

Figure 20:
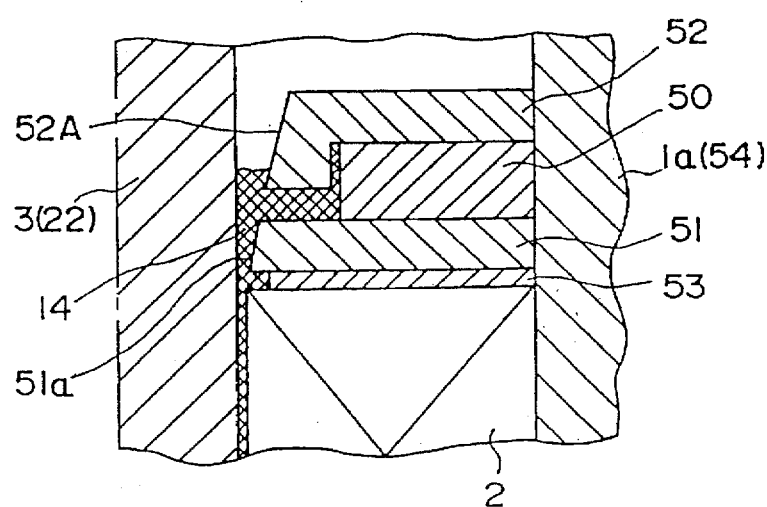
FIGS. 20(a) and 20(b) respectively illustrate a cross-sectional view of an essential part of a dynamic pressure bearing device according to an eleventh embodiment of the invention, and a diagram of a distribution of a magnetic flux density in a space defined by the device shown in FIG. 20(a)
Figure 20:
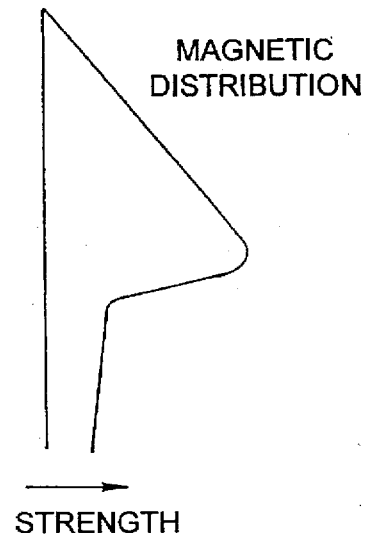

FIG. 20(a) is a cross sectional view of an essential part of a dynamic pressure bearing device according to an eleventh embodiment of this invention, whereas and FIG. 20(b) is a diagram showing a distribution of a magnetic flux density in a space shown in FIG. 20(a).

Referring to FIG. 20(a), the positioning of first and second magnetic members 51 and 52 and a central shaft 3 produces a magnetic flux in a space defined by the central shaft 3, first and second magnetic members 51 and 52, and magnet 50 that has a unidirectional gradient of magnetic flux density that increases as shown in FIG. 20(b). The surface 51a of the first magnetic member 51 which faces the central shaft 3 and the surface 52A of the second magnetic member 52 which faces the central shaft 3 are inclined to approach the outer periphery of the shaft 3.

The same results can be obtained from the device in FIG. 20(a) as from those according to the seventh through tenth embodiments already described. This is attributable to the magnetic flux in a space defined by the central shaft 3, first and second magnetic members 51 and 52, and magnet 50 which maintain a unidirectional gradient of magnetic flux density which increase according to FIG. 20(b).

Even if the surface 51a of the first magnetic member 51 which faces the shaft 3 is not inclined, a unidirectional gradient of magnetic flux density as shown in FIG. 20(b), can be obtained in the space defined by the central shaft 3, first and second magnetic members 51 and 52, and magnet 50. Specifically, this result can be obtained if the first magnetic member 51 is formed with a smaller thickness, while the second magnetic member 52 is so formed to be closer to the first magnetic member 51. However, when this occurs, the gradient of magnetic flux density in the space surrounded by the first magnetic member 51 is somewhat sharper than that shown in FIG. 20(b).

Figure 21:
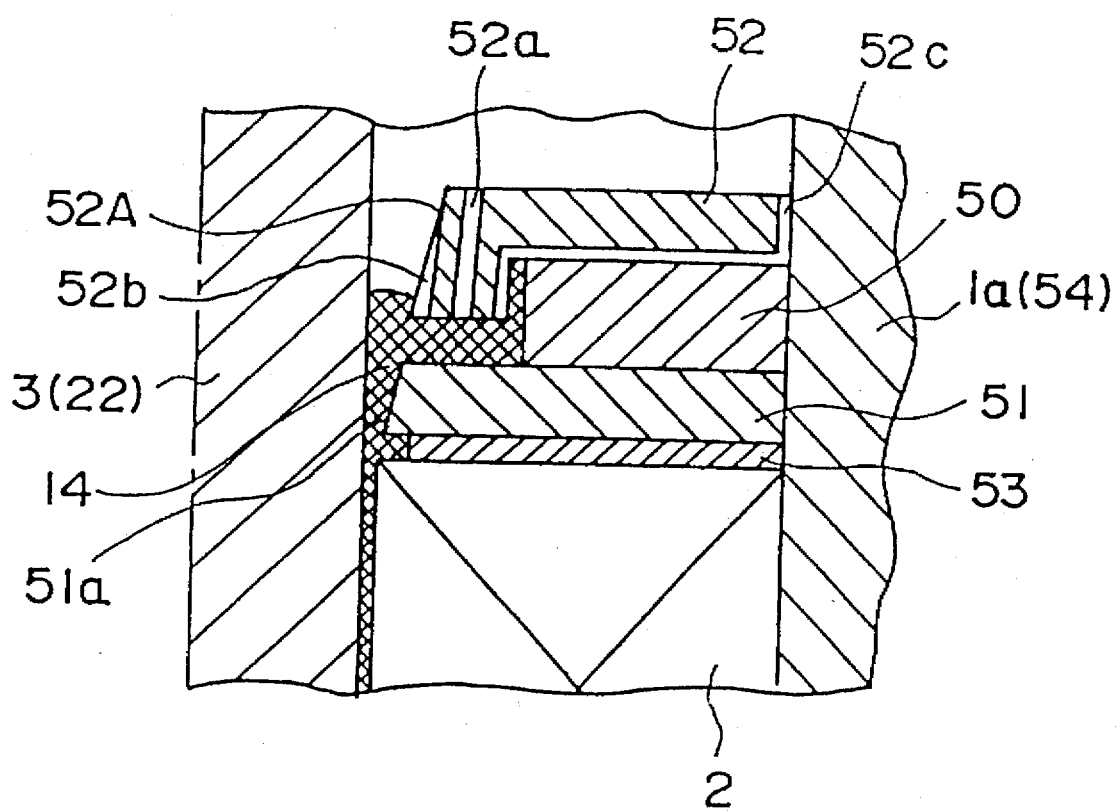
FIG. 21 illustrates a cross-sectional view of an essential part of a dynamic pressure bearing device according to a twelfth embodiment of the invention.

FIG. 21 is a cross sectional view of an essential part of a dynamic pressure bearing device according to a twelfth embodiment of this invention. Referring to FIG. 21, the second magnetic member 52 can include a through hole 52a through which air is allowed to escape from a space defined by the first and second magnetic members 51 and 52, magnet 50 and central shaft 3. This allows the pressure placed upon a the magnetic fluid seal to be controlled. Also, the hole 52a may be replaced by a recess 52b, or an opening 52c.

Although the seventh through twelfth embodiments of the invention have been described specifically by way of the devices shown in FIGS. 15 through 21, it is to be understood that variations may be made to these embodiments without departing from the scope and spirit of this invention. For example, it is possible to fix each of the first and second magnetic members, the magnet, and the nonmagnetic member to the central shaft 3 if the central shaft 3 is made of a magnetic material. It is also possible, referring to the second embodiment shown in FIG. 17, to fix the upper set of members and upper magnet to the central shaft 3 and the lower set of members and lower magnet to the hub 54 if the center shaft 3 is made of a magnetic material. It is alternatively possible to include a magnetic body facing each member or magnet.

Although a dynamic bearing pressure including the invention has been described as being employed with a spindle motor of the type having a rotary central shaft and fixed radial bearings or of the type having a fixed central shaft and rotary radial bearings, it is equally applicable to a spindle motor of the type having a rotary central shaft and rotary radial bearings which have a sliding surface along their outer periphery. It is also possible to employ the invention with a spindle motor having a fixed central shaft and fixed radial bearings.

Additionally, although the dynamic pressure bearing device described above for FIGS. 15 through 21 has been employed with a spindle motor for use in a hard disk drive, it is equally applicable to other types of motors including a motor for use in a laser beam printer.

Figure 22:
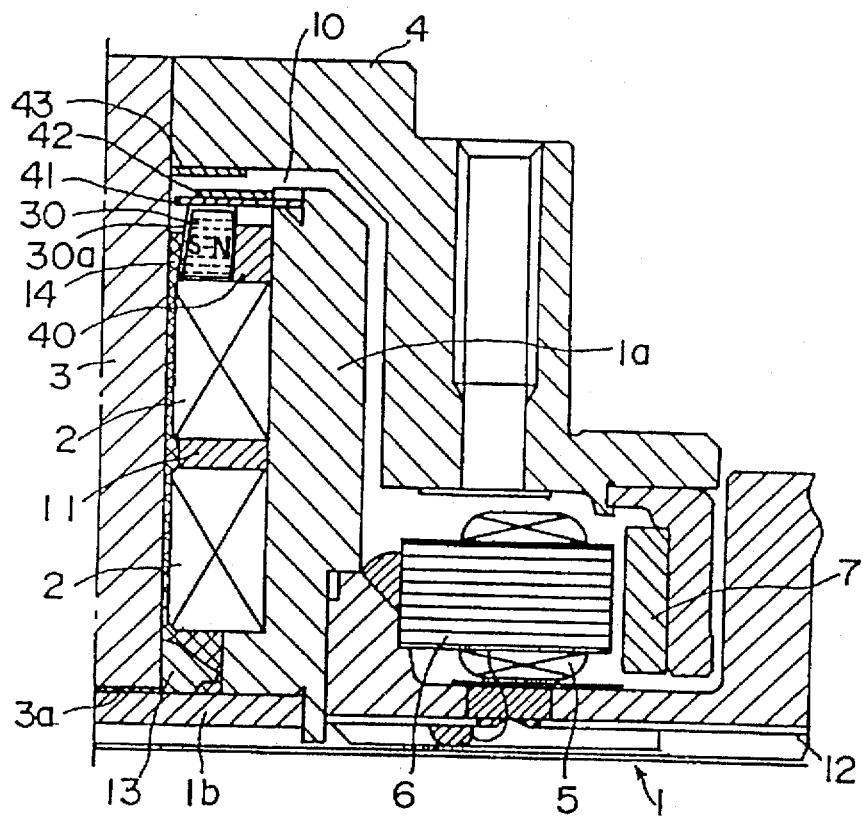
FIG. 22 illustrates a cross sectional view of a spindle motor for use in a hard disk drive which includes a dynamic pressure bearing device according to a thirteenth embodiment of the invention.

FIG. 22 is a cross sectional view of a spindle motor for use in a hard disk drive having a rotary central shaft and fixed radial bearings which includes a dynamic pressure bearing according to a thirteenth embodiment of the invention. Referring to FIG. 22, a central shaft 3 and a radial bearing 2 closest to an open end of a frame 1 are made of a magnetic material. A radially magnetized annular magnet 30 is mounted on a surface of the radial bearing 2 facing the open end of the frame 1. The magnet 30 is held by a retaining member 40 made of a magnetic material and secured to the radial bearing 2 closest to the open end of the frame 1. A magnetic circuit is formed by the magnet 30, central shaft 3, radial bearing 2 closest to the open end of the frame 1, and retaining member 40. Also, the surface 30a of the magnet 30 which faces the central shaft 3 is inclined, in a downward direction, so as to approach an outer periphery of the central shaft 3. Also provided is a stopper 41, which is made of a nonmagnetic material, and absorbing sheets at 42 and 43.

FIGS. 13 and 14 show an axial distribution of magnetic fluxes A and B produced in a space between the magnet 30 and the central shaft 3 as a result of the magnetic circuit formed between the magnet 30 having the inclined surface 30a and the central shaft 3. The magnetic flux A in the space between the magnet 30 and the central shaft 3 has a gradient which falls within a Range X shown in FIG. 14. In other words, the magnetic flux density in the space between the magnet 30 and the central shaft 3 has a gradient which increases unidirectionally in a direction opposite to the open end of the frame 1.

In view of this magnetic flux density gradient which increases in a direction opposite to the open end of the frame 1, a magnetic fluid 14 is held in position by the resulting magnetic forces. In particular, a unidirectional gradient of magnetic flux density which corresponds substantially to a sharp gradient shown as A' in FIG. 14 defines a magnetic force that will retain the magnetic fluid 14 if the surface level of the magnetic fluid 14 changes due to variations in atmospheric pressure, temperature, part sizes, or in the amount of the magnetic fluid 14. Also, a unidirectional gradient of magnetic flux which corresponds substantially to a gentle gradient as shown at AA' in FIG. 14 defines a magnetic force that will retain the magnetic fluid 14 if the surface level of the magnetic fluid 14 changes due to vibration, impact, centrifugal forces, or changes in position of the device. The gradient AA' is beneficial in this regard given that it provides a large unidirectional gradient of magnetic flux density at remote distances from the magnet 30.

Referring again to FIG. 22, the radial bearing 2 closest to the open end of the frame 1 and the retaining member 40 are made of a magnetic material to form a magnetic circuit with the central shaft 3 and the magnet 30. This magnetic circuit provides better results than that of a magnetic circuit formed only by the central shaft 3 and the magnet 30.

It is desirable that the unidirectional magnetic flux density gradient be axially long and sharp and that a space having a large volume be available for holding the magnetic fluid 14. The desired gradient and volume are easily achieved by altering the inclination of the magnet 30.

Figure 23:
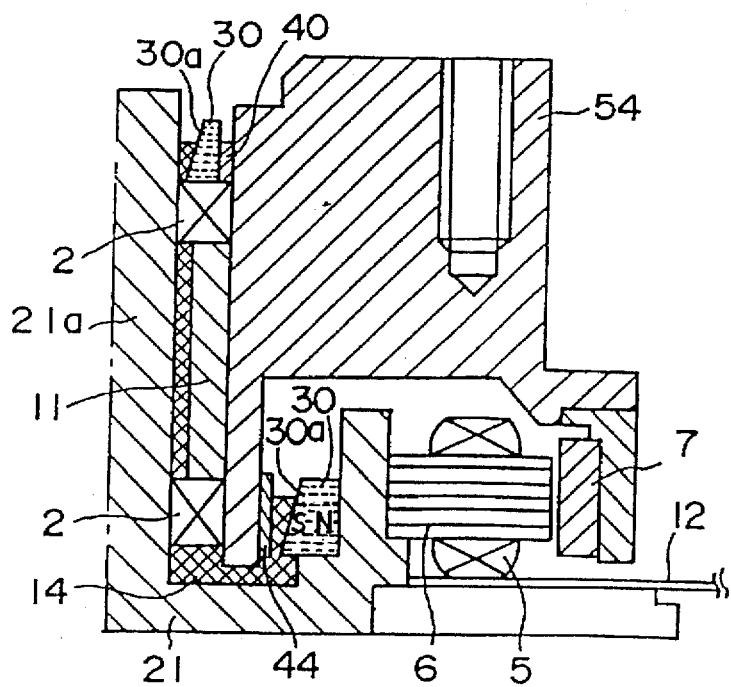
FIG. 23 illustrates a cross sectional view of a spindle motor for use in a hard disk drive which includes a dynamic pressure bearing device according to a fourteenth embodiment of the invention.

FIG. 23 is a cross sectional view of a spindle motor for use in a hard disk drive having a fixed central shaft and rotary radial bearings which includes a dynamic pressure bearing according to a fourteenth embodiment of the invention. Like numerals are used in FIG. 23 to denote those parts which are equal in construction or function to those described above in the description of the thirteenth embodiment.

Referring to FIG. 23, the motor includes a central shaft 21a which is fixed to a frame 21 made of a magnetic material. The motor further includes a pair of magnets 30 which are mounted closer to open ends of the frame 21 than a pair of radial bearings 2. The magnets 30 are present to prevent the magnetic fluid 14 from leaking through either open end. The central shaft 21a facing the upper magnet 30 and a member 44, or hub 54 if member 44 is not employed, facing the lower magnet 30 are made of a magnetic material to form a magnetic circuit which is similar to that formed in the device according to the thirteenth embodiment. The same results can be obtained from the fourteenth embodiment as from the thirteenth embodiment.

Figure 24:
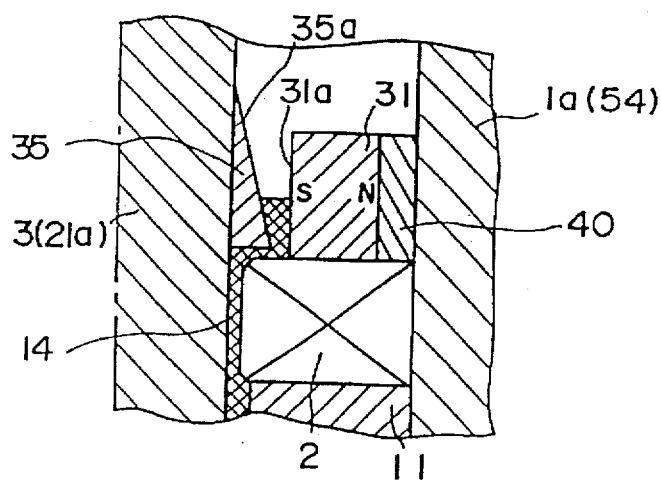
FIG. 24 illustrates a cross sectional view of a dynamic pressure bearing device according to a fifteenth embodiment of the invention.

FIG. 24 is a cross sectional view of a dynamic pressure bearing device according to a fifteenth embodiment of this invention. Referring to FIG. 24, a surface 31a of a magnet 31 which faces a central shaft 3 is not inclined. However, an annular magnetic body 35 which is secured to an outer periphery of the central shaft 3 maintains a surface 35a which faces the magnet 31. The surface 35a of the magnetic body 35 is inclined to approach the surface 31a of the magnet 31 in the direction opposite to the open end of a frame 1.

The same results can be obtained from the device shown in FIG. 24, as from the device shown in FIG. 22, since a magnetic circuit is formed by the magnet 31, magnetic body 35, radial bearing 2 closest to the open end of the frame 1, and retaining member 40. Specifically, the same results are available given that the magnetic circuit produces, in a space between the magnetic body 35 and the magnet 31, a magnetic flux density gradient which increases unidirectionally in a direction opposite to the open end of the frame 1.

Figure 25:
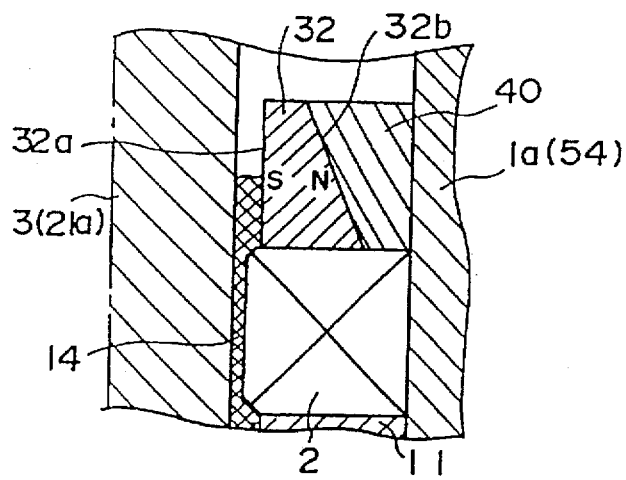
FIG. 25 illustrates a cross sectional view of a dynamic pressure bearing device according to a sixteenth embodiment of the invention; and, FIGS. 26(a) and 26(b) respectively illustrate a cross sectional view of a dynamic pressure bearing device according to a seventeenth embodiment of the invention, and a diagram showing a magnetization profile of a magnet shown in FIG. 26(a).

FIG. 25 is a cross sectional view of a dynamic pressure bearing device according to a sixteenth embodiment of the invention. Referring to FIG. 25, a surface 32a of a magnet 32 which faces a central shaft 3 is not inclined. However, in contrast to the device shown in FIG. 22, a back surface 32b remote from surface 32a is inclined as to give the magnet 32 a radial thickness increasing in the direction opposite to the open end of a frame 1.

The same results can be obtained from the device shown in FIG. 25 as from the device shown in FIG. 22, since a magnetic circuit is formed by the magnet 32, central shaft 3, a radial bearing 2 closest to the open end of the frame 1, and retaining member 40. Specifically, the same results are available given that the magnetic circuit produces, in a space between the central shaft 3 and the magnet 32, a magnetic flux density gradient which increases unidirectionally in a direction opposite to the open end of the frame 1.

Figure 26:
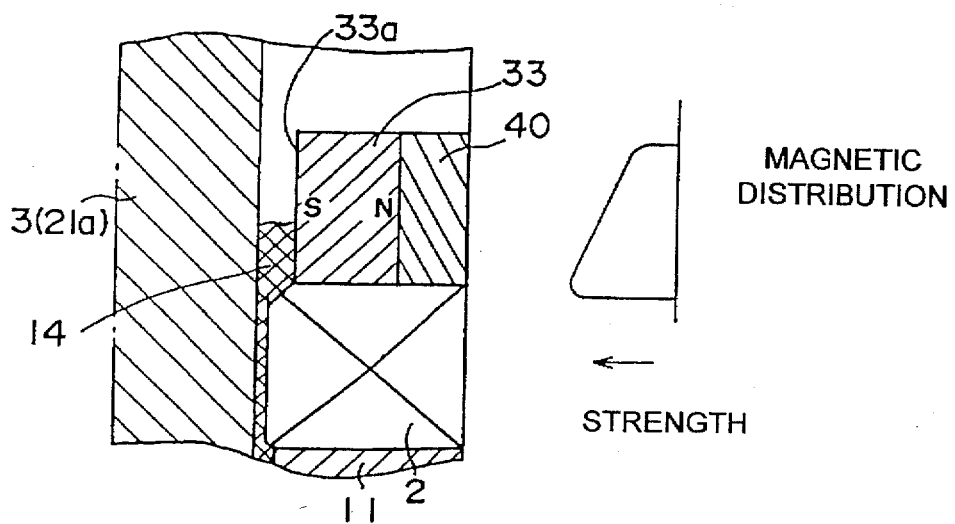

FIG. 26(a) is a cross sectional view of a dynamic pressure bearing device according to a seventeenth embodiment of the invention, and FIG. 26(b) is a diagram showing a magnetic distribution of a magnet shown in FIG. 26(a). Referring to FIGS. 26(a) and 26(b), the surface 33a of the magnet 33 which faces a central shaft 3 is not inclined as compared to the device shown in FIG. 22. However, the magnet 33 is magnetized so as to have a magnetization strength increasing in a direction opposite to the open end of the frame 1. The same results can be obtained from the seventeenth embodiment as from the device shown in FIG. 22.

Although the thirteenth through seventeenth embodiments of the invention have been specifically described above, it is to be understood that variations may be made from these embodiments without departing from the scope and spirit of this invention. For example it is possible to fix each of the magnets 30 through 33 to the central shaft 3. Alternatively, in a device according to the fourteenth embodiment as shown in FIG. 23, it is possible to fix the upper magnet 30 to the shaft 21a, and fix the lower magnet 30 to the hub 54. Additionally, it is possible to include a magnetic body to face each of the magnets 30 through 33. Moreover, each of the magnets 30 through 33 may be magnetized a multiple number of times circumferentially with alternating north and south poles.

Although dynamic pressure bearing devices according to the thirteenth through seventeenth embodiments of the invention have been described as being employed with a spindle motor of the type having a rotary central shaft and fixed radial bearings or of the type having a fixed central shaft and rotary radial bearings, the invention is equally applicable to a spindle motor of the type which has a rotary central shaft and rotary radial bearings with a sliding surface along their outer periphery, or with a spindle motor of the type having a fixed central shaft and fixed radial bearings.

Additionally, although dynamic pressure bearing devices according to the thirteenth through seventeenth embodiments of the invention have been described as being employed with a spindle motor for use in a hard disk drive, the invention is equally applicable for use in other types of motors including a motor for a laser beam printer.

The present invention is not to be considered limited in scope by the preferred embodiments described in the specification. Additional advantages and modifications, which will readily occur to those skilled in the art from consideration of the specification and practice of the invention, are intended to be within the scope and spirit of the following claims.

We claim:

1. A bearing device used in a motor, where the motor includes a shaft made of a magnetic material and a frame made of a magnetic material, said device comprising:

a bearing connected to one of said shaft and said frame;

a magnetic fluid filled in a space between said shaft and frame;

a primary magnetic fluid sealing means for sealing said magnetic fluid, said primary magnetic fluid sealing means producing an axial magnetic flux density gradient in said space which increases unidirectionally in a direction away from an open end of said frame, and said primary magnetic fluid sealing means being located closer to said open end of said frame than said bearing; and, a secondary magnetic fluid sealing means for sealing said magnetic fluid, said secondary magnetic fluid sealing means being located closer to said open end of said frame than said primary magnetic fluid sealing means, and said secondary magnetic fluid sealing means including a nonmagnetic plate which has a surface that allows said magnetic fluid coming into contact with said surface to form into one of a bead or a droplet.

2. A bearing device according to claim 1, wherein:

said secondary magnetic sealing means is said nonmagnetic plate;

a layer of material is attached to at least one of an outer surface of said nonmagnetic plate and an outer surface of said shaft; and, a contact angle between said layer of material and said magnetic fluid is greater that a contact angle between said magnet and said magnetic fluid.

3. A bearing device according to claim 2, wherein said layer of material is a polymeric material selected from a group consisting of polytrifluoroethylene, polyvinylidene, fluoride, and polyvinyl.

4. A bearing device according to claim 2, wherein said layer of material has a low energy surface selected from a group consisting of fluorocarbon and hydrocarbon.

5. A bearing device according to claim 1, wherein a distance between said secondary magnetic fluid sealing means and said shaft is smaller than a distance between said primary magnetic sealing means and said shaft to further prevent said magnetic fluid from leaking from said motor.

6. A bearing device according to claim 5, wherein a portion of said shaft includes a surface which allows magnetic fluid coming into contact with it to form into one of a bead or a droplet, where said portion of said shaft is adjacent to said secondary magnetic fluid sealing means.

7. A bearing device according to claim 6, wherein said secondary magnetic fluid sealing means further includes an oil absorbent member which is exposed to said open end of said frame.

8. A bearing device according to claim 7, wherein said oil absorbent member is positioned above said primary magnetic fluid sealing means.

9. A bearing device used in a motor, where the motor includes a shaft made of a magnetic material and a frame made of a magnetic material, said device comprising:

a bearing connected to one of said shaft and said frame;

a magnetic fluid filled in a space between said shaft and frame;

a primary magnetic fluid sealing means for sealing said magnetic fluid, said primary magnetic fluid sealing means producing an axial magnetic flux density gradient in said space which increases unidirectionally in a direction away from an open end of said frame, and said primary magnetic fluid sealing means being located closer to said open end of said frame than said bearing; and, a secondary magnetic fluid sealing means for sealing said magnetic fluid, said secondary magnetic fluid sealing means being located closer to said open end of said frame than said primary magnetic fluid sealing means, and said secondary magnetic fluid sealing means including a magnetic plate which seals said magnetic fluid while simultaneously allowing air to escape.

10. A bearing device according to claim 9, wherein:

said secondary magnetic fluid sealing means is said magnetic plate;

a clearance is defined between an end surface of said magnetic plate and an outer surface of one of said shaft and said frame;

a portion of said magnetic fluid is retained in said clearance to form a seal; and, a hole is defined in said magnetic plate to allow air to escape while simultaneously retaining said magnetic fluid.

11. A bearing device according to claim 10, wherein said hole maintains a magnetic flux density which does not exceed one-half of a magnetic flux density in said clearance.

12. A bearing device according to claim 9, wherein said secondary magnetic fluid sealing means is provided with a opening to allow air to escape.

13. A bearing device comprising:

a radial bearing fixed to one of a fixed member and a revolving member, said radial bearing being adapted to rotatably support said revolving member;

a magnetic fluid filled in a region between said radial bearing and said revolving member;

a magnet mounted to one of said fixed member and said revolving member, said magnet being located closer to an open end of said frame than said radial bearing;

a magnetic body mounted to one of said fixed member and said revolving member, said magnetic body being oriented to radially face said magnet; and, a magnetic fluid sealing plate being located closer to said open end of said frame than said magnet, where said magnetic fluid sealing plate is made of a nonmagnetic material with a surface that allows said magnetic fluid coming into contact with said surface to form into one of a bead or a droplet;

wherein said magnetic body and said magnet collectively form a magnetic circuit with an axial magnetic flux density gradient in a space defined between said magnetic body and said magnet that increases unidirectionally in a direction away from said open end of said frame.

14. A bearing device according to claim 13, wherein a contact angle between said nonmagnetic material and said magnetic fluid is greater than a contact angle between said magnet and said magnetic fluid.

15. A bearing device according to claim 13, wherein a contact angle between said magnetic body and said magnetic fluid is greater than a contact angle between said magnet and said magnetic fluid.

* * * * *